(12) United States Patent
Nakano et al.

(10) Patent No.: US 6,387,148 B1
(45) Date of Patent: May 14, 2002

(54) HYDROGEN ABSORBING ALLOY COMPACT FOR USE AS THE NEGATIVE ELECTRODE OF AN ALKALINE RECHARGEABLE BATTERY

(75) Inventors: Hajime Nakano; Noriaki Hamaya; Satoshi Shima, all of Fukui-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/626,956

(22) Filed: Jul. 27, 2000

(30) Foreign Application Priority Data

| Jul. 30, 1999 | (JP) | 11-216872 |
| Sep. 8, 1999 | (JP) | 11-254369 |
| Apr. 7, 2000 | (JP) | 2000-105813 |

(51) Int. Cl.$^7$ ............................. C22C 19/00; H01M 4/58
(52) U.S. Cl. ................... 75/230; 429/216; 429/218.2
(58) Field of Search .................. 75/230; 419/2, 419/37, 32, 33; 429/217, 218.2

(56) References Cited

U.S. PATENT DOCUMENTS

| 4,110,425 A | * | 8/1978 | Buhl et al. ............... 423/648 R |
| 4,915,898 A | | 4/1990 | Wolf et al. ..................... 419/3 |
| 5,662,729 A | * | 9/1997 | Nishimura et al. ............ 75/252 |
| 5,766,792 A | | 6/1998 | Hirosawa et al. .............. 429/59 |
| 5,858,571 A | | 1/1999 | Ishii et al. ..................... 429/59 |
| 5,900,558 A | * | 5/1999 | Nakamura et al. ............ 75/228 |
| 5,908,487 A | | 6/1999 | Nishimura et al. ............ 75/255 |
| 5,932,034 A | | 8/1999 | Ishii et al. .................... 148/513 |
| 5,962,165 A | * | 10/1999 | Tsuruta et al. ............ 429/218.2 |
| 6,063,524 A | | 5/2000 | Kasashima et al. ...... 429/218.2 |

FOREIGN PATENT DOCUMENTS

| JP | 59-147032 | 2/1984 | ............ C08K/3/08 |
| JP | 01119501 A | 5/1989 | ............ C01B/3/00 |
| JP | 02306541 A | 12/1990 | ............ H01M/4/26 |
| JP | 03116655 A | 5/1991 | ............ H01M/4/24 |
| JP | 04181655 A | 6/1992 | ............ H01M/4/26 |
| JP | 04292860 A | 10/1992 | ............ H01M/4/38 |
| JP | 06044965 A | 2/1994 | ............ H01M/4/26 |
| JP | 08 170129 A | 12/1994 | ............ C22C/19/00 |
| JP | 08007891 | 1/1996 | ............ H01M/4/26 |
| JP | 08213005 A | 8/1996 | ............ H01M/4/26 |
| JP | 09031502 A | 2/1997 | ............ B22F/3/02 |
| WO | WO 993126 | 7/1999 | ............ H01M/4/26 |

OTHER PUBLICATIONS

European Search Report for Patent No. 00116386.4; dated Dec. 12, 2000.

* cited by examiner

*Primary Examiner*—Ngoclan Mai
(74) *Attorney, Agent, or Firm*—Myers Bigel Sibley & Sajovec, P.A.

(57) ABSTRACT

The present invention provides a hydrogen absorbing alloy compact for use as the negative electrode of an alkaline rechargeable battery which is made without the aid of a current-collecting support, contains a binder dispersed in the interstices formed by mutual contact of hydrogen absorbing alloy particles and on the alloy surfaces, and has a bulk density of 3.5 to 6.0 g/cm$^3$. The present invention also provides a compact electrode which is made by forming a porous hydrogen absorbing alloy compact containing neither current-collecting support nor binder, impregnating the compact with an aqueous solution (or solvent solution) of a binder, and then drying the compact to remove the water (or solvent) alone, so that the strength of the compact is increased and good electrical contact between alloy particles is established.

39 Claims, 3 Drawing Sheets

HYDROGEN ABSORBING ALLOY COMPACT FOR USE AS THE NEGATIVE ELECTRODE OF AN ALKALINE RECHARGEABLE BATTERY

BACKGROUND OF THE INVENTION

1. Field of the Invention

This invention relates to hydrogen absorbing alloy compacts for use as the negative electrodes of alkaline rechargeable (secondary) batteries, and a method of making the same.

2. Description of the Related Art

Hydrogen absorbing alloys are intermetallic compounds capable of absorbing and desorbing hydrogen electrochemically, and are chiefly used as electrode materials for the negative electrodes of alkaline rechargeable batteries. Such an alloy is hydrided during the charging of the electrode and dehydrided during the discharging thereof, so that it undergoes volume changes during charging and discharging. Consequently, it has been impossible to use such an alloy alone as an electrode, because alloy disintegration causes a failure of the electrode. For this reason, it has been common practice to use an electrode made by reducing a hydrogen absorbing alloy ingot to a powder of a certain particle size by mechanical grinding or the like, and then applying the powder to a current-collecting support such as foamed nickel or punching metal.

The structure of such a conventional electrode is shown in FIG. 2. In this conventional electrode, a binder 3 is used to prevent a hydrogen absorbing alloy powder 4 from falling off a current-collecting support 1. Moreover, an electrically conductive material 2 such as carbon or powdered nickel is added thereto for the purpose of securing good electrical conductivity between the hydrogen absorbing alloy powder 4 and the current-collecting support 1.

This conventional electrode is made by kneading a hydrogen absorbing alloy powder thoroughly with a binder and an electrically conductive material in an aqueous medium to form a slurry, applying this slurry to a current-collecting support, and pressing the resulting assembly.

Meanwhile, in order to enhance the electrode capacity of a negative electrode, it is effective to increase the proportion of the hydrogen absorbing alloy to the entire electrode. The best method is to make an electrode of a hydrogen absorbing alloy alone and thereby construct a nickel-hydrogen rechargeable (secondary) battery having a high capacity. According to this method, the present inventors made a porous body by forming a compact from a hydrogen absorbing alloy powder having a specific particle diameter (i.e., such a particle diameter as not to promote particle size reduction due to hydriding and dehydriding of the hydrogen absorbing alloy) without using a current-collecting support or a binder, and then sintering this compact. It has been reported that, since this porous sintered body does not contain any material incapable of contributing to the absorption and desorption of hydrogen (e.g., a current-collecting support or a binder), it has a greater amount of alloy loaded and hence a higher electrode capacity density. However, when such a sintered body electrode is made, it undergoes dimensional changes during sintering. Consequently, electrodes and like products requiring high dimensional accuracy must be machined, so that the amount of alloy corresponding to a margin for machining is wasted. Accordingly, it is desired to use an electrode comprising a compact in which no dimensional change occurs and, therefore, no alloy is wasted by machining.

In the case of a compact suffering no dimensional changes, it is also desired to make a desired electrode with high dimensional accuracy. Accordingly, it is intended to form a compact from an alloy powder alone. According to this method, the resulting compact scarcely needs to be machined and hence causes no appreciable alloy loss. However, when a compact formed simply by pressing an alloy powder is used as an electrode, the bulk density of the compact is lower than that of a sintered body, and the electrode capacity density of the electrode is reduced correspondingly. As used herein, the term "bulk density" means the volume density of a sintered body or compact including its void space. Nevertheless, there are known several means for enhancing the electrode capacity density of the compact. They include, for example, using an alloy having a higher alloy capacity (mAh/g) per unit weight, and increasing the packing density by modifying the particle size distribution or by raising the compacting pressure. Moreover, a compact containing no binder has a low mechanical strength and, therefore, cannot withstand even the minimum required machining (e.g., machining for fine adjustment in the direction of the height). Furthermore, when such a compact is used as an electrode, the electrode is disintegrated as a result of charging and discharging, and the alloy powder constituting the compact electrode falls off. Thus, the electrode performs its function no more.

In the case of pressed compacts comprising a hydrogen absorbing alloy powder and a binder, various investigations on compacts for use in the storage of hydrogen and for use as the negative electrodes of alkaline rechargeable batteries have been made, as described in Japanese Patent Provisional Publication Nos. 1-119501, 8-7891, 9-31502, 4-181655 and 59-147032. However, in these prior art, the disintegration of the compact due to a fracture of the hydrogen absorbing alloy during the absorption and desorption of hydrogen is avoided by using a hydrogen absorbing alloy powder having a large particle diameter of several tens of micrometers for the formation of a compact, or by increasing the amount of binder contained in the compact. Nevertheless, when such a compact is used as the negative electrode of an alkaline rechargeable battery, a large amount of binder interferes with contact between hydrogen absorbing alloy particles and thereby increases the electric resistance. Moreover, the amount of hydrogen absorbing alloy present in the compact is decreased to cause a reduction in electric capacity when the compact is used as an electrode.

SUMMARY OF THE INVENTION

In view of the above-described problems of the prior art, the present inventors made intensive investigations with a view to developing a hydrogen absorbing alloy compact for use as the negative electrode of an alkaline rechargeable battery which, even when the compact containing no current-collecting support (or electrically conductive core) is used as an electrode, can prevent the compact electrode from being disintegrated by charge-discharge cycles and can achieve a desired discharge capacity, and which shows a further improvement in discharge characteristics by properly choosing the time of addition of an electrically conductive material. Also, it is another object of the present invention to provide a compact that is easily recycled.

As a result, the present inventor have now found that these problems can be solved by forming a porous compact having a specific bulk density from a hydrogen absorbing alloy powder alone and allowing a binder to be dispersed in the interstices formed by mutual contact of particles of the aforesaid hydrogen absorbing alloy powder and on the alloy surfaces. The bulk density (apparent density) represents a mass for the unit volume based on the geometric volume of outer shape of a material. The bulk density can be determined, for example, by mercury displacement or by aerometers.

In order to accomplish the above object, the present invention provides a hydrogen absorbing alloy compact for use as the negative electrode of an alkaline rechargeable battery which is made without the aid of a current-collecting support, contains a binder dispersed in the interstices formed by mutual contact of hydrogen absorbing alloy particles and on the alloy surfaces, and has a bulk density of 3.5 to 6.5 g/cm$^3$.

Moreover, in the present invention, it is preferable that the aforesaid hydrogen absorbing alloy compact have a porosity of 15 to 55%. As used herein, the term "porosity" means the proportion of the void space of the compact as based on the true density of the alloy [i.e., {1−(bulk density of compact)/(true density of alloy)}×100]. The true density is a density measured by immersing an alloy mass into water.

It is also preferable to use a water-soluble polymer as the aforesaid binder. The aforesaid binder is preferably contained in an amount of 0.01 to 2.0% by weight based on the aforesaid compact.

It is also preferable that the aforesaid hydrogen absorbing alloy powder have an average particle diameter of not greater than 20 μm and an oxygen concentration of not greater than 0.50% by weight.

Moreover, in a preferred embodiment of the present invention, the hydrogen absorbing alloy powder contains an electrically conductive material mixed therewith during its grinding in an inert gas.

According to another aspect of the present invention, there is provided a method of making a hydrogen absorbing alloy compact for use as the negative electrode of an alkaline rechargeable battery which comprises the steps of forming a porous compact from a hydrogen absorbing alloy powder alone or a powder mixture of a hydrogen absorbing alloy powder and an electrically conductive material, without using a current-collecting support or a binder; impregnating the compact with an aqueous solution or solvent solution of a binder; and evaporating only the water or solvent contained in the compact as a result of the impregnation.

Thus, the present invention can provide a hydrogen absorbing alloy compact for use as the negative electrode of an alkaline rechargeable battery which, even when the compact containing no current-collecting support is used as an electrode, can prevent the compact electrode from being disintegrated by charge-discharge cycles owing to its high mechanical strength, and can achieve a desired discharge capacity, and which further exhibits an excellent high rate discharge property.

Another problem to be solved by the present invention is to provide a compact (in particular, a polyhedral compact) containing no current-collecting support (or electrically conductive core) but suitable for use as an electrode in which the strength of the compact is increased and its electrical conductivity is maintained, so that the compact electrode can be prevented from being disintegrated by charge-discharge cycles and a desired discharge capacity can be achieved.

As a result of intensive investigations made with a view to solving the above-described problem, the present invention provides a compact electrode which is made by forming a porous hydrogen absorbing alloy compact containing neither current-collecting support nor binder for the compact, impregnating the compact with an aqueous solution (or solvent solution) of a binder, and then drying the compact to remove the water (or solvent) alone, so that the strength of the compact is increased and good electrical contact between alloy particles is established. Moreover, the present invention also provides an alkaline rechargeable battery using this compact electrode.

The porous hydrogen absorbing alloy compact electrode having been impregnated with an aqueous solution of a binder in accordance with the present invention can provide an electrode having a high mechanical strength and suffering no specimen disintegration due to charge-discharge cycles.

DETAILED DESCRIPTION OF THE PREFERRED EMBODIMENTS

Figure 1:
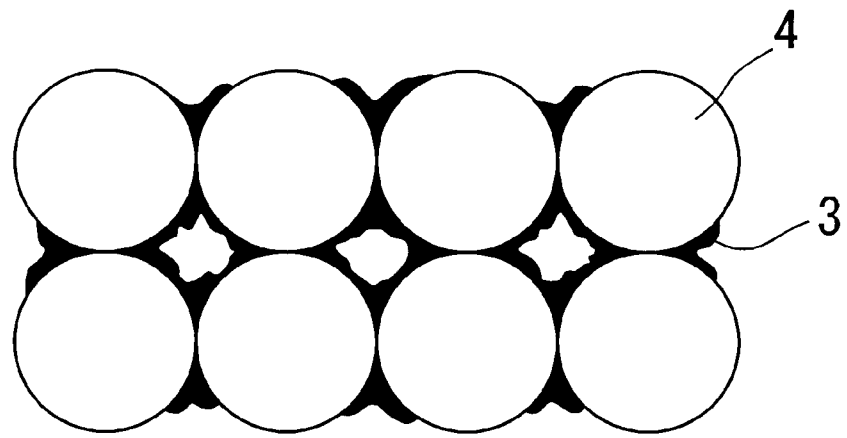
FIG. 1 is a schematic view showing the structure of an electrode comprising a hydrogen absorbing alloy compact for use as the negative electrode of an alkaline rechargeable battery in accordance with the present invention.

With respect to the hydrogen absorbing alloy compacts for use as the negative electrodes of alkaline rechargeable batteries (which may hereinafter be referred to simply as the "compacts") in accordance with the present invention, and the methods of making the same, embodiments of the present invention will be specifically described hereinbelow.

First of all, the hydrogen absorbing alloy powder used in the present invention is described. No particular limitation is placed on the composition of the hydrogen absorbing alloy ingot used for the preparation of a hydrogen absorbing alloy powder, and the method of the preparing the same. There may be used any hydrogen absorbing alloy having a structure represented by AB$_n$ in which n is a positive number of 1 to 6.

By way of example, AB$_5$ type hydrogen absorbing alloys are described below in detail.

In the AB$_5$ system, the A-side element comprises La alone or a combination of one or more rare earth elements and La. Specific examples thereof include La, Mm (i.e., misch metal comprised of La, Ce, Pr or Nd), Lm (i.e., La-rich Mm), and these combinations additionally containing other rare earth elements. It is preferable that such combinations of rare earth elements contain not less than 20 mole percent of La.

The B-side element preferably has a composition represented by (Ni)$_a$(CO)$_b$(Al)$_c$(Mn)$_d$(M)$_e$. In this formula, a is a positive number of 1.8 to 6.0, b is 0 or a positive number of not greater than 1.0, c is 0 or a positive number of not greater than 0.4, d is 0 or a positive number of not greater than 0.6, and e is 0 or a positive number of not greater than 0.2. M is at least one element selected from the group consisting of Si, Fe, Pb, Ti, Ca, Mg, Cu, In, Zn, Cr and Zr.

In the present invention, the aforesaid hydrogen absorbing alloy compact preferably has a porosity of 25 to 55%. As used herein, the term "porosity" means the proportion of the void space of the compact as based on the true density of the alloy [i.e., {1−(bulk density of compact)/(true density of alloy)}×100].

If the porosity is less than 15%, the electrolyte content of the compact may be decreased when it is used in a battery, and it may fail to function satisfactorily as an electrode. If the porosity is greater than 55%, the compact may undesirably show a reduction in strength and, moreover, in electric capacity. The preferred porosity is between 25 to 55%.

After various metallic elements are mixed so as to give the above-described composition, they are melted at a temperature of 1,300 to 1,600° C. in an atmosphere of an inert gas (e.g., argon) by means of a high-frequency melting furnace, arc melting furnace or the like. Then, the resulting melt is cooled to form a hydrogen absorbing alloy ingot. In this step, a hydrogen absorbing alloy ribbon may be formed by a rapid quenching technique such as rapid roll quenching. If necessary, the hydrogen absorbing alloy ingot may be heat-treated at a temperature of around 1,000° C. in an inert atmosphere of Ar or the like.

Subsequently, the hydrogen absorbing alloy ingot is pulverized to prepare a hydrogen absorbing alloy powder. The pulverization is carried out by means of a jet mill or an attritor. It is preferable that, prior to this pulverization, the hydrogen absorbing alloy ingot is coarsely ground to an average particle diameter of not greater than 1,000 $\mu$m in an atmosphere of an inert gas (e.g., argon or nitrogen gas) by means of a jaw crusher, roller mill, ball mill, Brown mill or the like. Alternatively, the coarse grinding may be effected by hydriding size reduction.

In the present invention, an alloy powder obtained by pulverizing the coarsely ground hydrogen absorbing alloy powder with a jet mill or attritor is preferably used for the formation of a compact.

More specifically, the coarsely ground hydrogen absorbing alloy powder is preferably pulverized to an average particle diameter of not greater than 20 $\mu$m, either by dry grinding in an atmosphere of an inert gas (e.g., argon or nitrogen gas) with a jet mill having a gas pressure of 5.0 to 6.5 kgf/cm$^2$, or by wet grinding with an attritor. In particular, the coarsely ground hydrogen absorbing alloy powder is preferably to an average particle diameter of not greater than 20 $\mu$m, more preferably not greater than 15 $\mu$m, further preferably not greater than 10 $\mu$m, and most preferably in the range of 5 to 8 $\mu$m. Thus, the average particle diameter of the alloy powder used in the present invention is made equal to or smaller than the average particle diameter of a conventionally used alloy powder having been subjected to hydrogen absorbing and desorbing cycles, so that the hydrogen absorbing alloy forming the compact will not suffer particle size reduction during hydrogen absorption and desorption in the compact. Accordingly, with consideration for the strength and shape retention of the compact, it is preferable to pulverize the hydrogen absorbing alloy powder to an average particle diameter of not greater than 20 $\mu$m.

In the present invention, it is especially preferable to use a hydrogen absorbing alloy powder which has been pulverized by dry grinding with a jet mill. When a jet mill is used, the hydrogen absorbing alloy powder is pulverized in an atmosphere of an inert gas. In this step, it is desirable to use an inert gas having an oxygen concentration of not greater than 0.5% by volume and preferably not greater than 0.1% by volume. The hydrogen absorbing alloy powder which has been pulverized in this manner has an oxygen concentration of not greater than 0.50% by weight, in spite of its average particle diameter of not greater than 10 $\mu$m.

It is desirable that the amount of oxygen present in the interior of the alloy and on the surfaces thereof be not greater than 0.50% by weight. If it is greater than 0.5% by weight, the charge-discharge characteristics may be reduced.

Moreover, according to a preferred embodiment of the present invention, an electrically conductive material is added to the alloy during its grinding, so that both of them are pulverized and mixed at the same time. This not only improves the dispersibility of the electrically conductive material in the alloy, but also yields batteries showing an enhancement in a high rate discharge property. The electrically conductive materials which can be added for this purpose include metallic nickel, cobalt and copper, compounds of the foregoing metals (e.g., cobalt monoxide), compound oxides of the foregoing metals, and carbon. Although the amount of electrically conductive material added may be suitably controlled so as to give high battery characteristics, it is preferably in the range of 0.1 to 20% by weight based on the alloy.

The electrically conductive material may be added before coarse grinding, after coarse grinding and before pulverization, or during pulverization. Accordingly, the average particle diameter of the electrically conductive material may vary according to the time of its addition. For example, the average particle diameter may be not less than 1 mm where the electrically conductive material is added before coarse grinding, and the average particle diameter may be in the range of about 1 to 30 $\mu$m where the electrically conductive material is added during pulverization. It is preferable that, after pulverization, the electrically conductive material finally have an average particle diameter of 1 to 10 $\mu$m. Within this range, the electrically conductive material can be uniformly dispersed in the hydrogen absorbing alloy to improve its electrical conductivity effectively.

The fine alloy powder thus obtained is charged into a die and pressed to form a compact having a desired shape. The compact so formed preferably has a bulk density in the range of 3.5 to 6.5 g/cm$^3$, more preferably in the range of 3.50 to 6.0 g/cm$^3$, and most preferably 4.0 to 6.0 g/cm$^3$. If the bulk density of the compact is less than 3.5 g/cm$^3$, its porosity may exceed 55% to cause an extreme reduction in the strength of the compact. If the bulk density of the compact is greater than 6.5 g/cm$^3$, its porosity may be less than 15%, so that the strength of the compact may be reduced owing to a decrease of the void space into which a binder solution penetrates in the binder impregnation step which will be described later. Moreover, when this compact is used as an electrode, the amount of electrolyte penetrating thereinto may be decreased to cause a reduction in charging-discharging efficiency.

No particular limitation is placed on the compacting method employed, and useful compacting methods include, for example, die pressing, rubber pressing, extrusion molding and injection molding. A compact with a slit or hole can be similarly formed using metal molds. The cross-sectional shape of a slit may be circular or polygonal (square, rectangle, hexagonal, octagonal, etc.). The slit may have a depth of 50% or more of the thickness of the compact so as not to penetrate the compact. A plurality of such slits may also be provided. When vertical die pressing is employed, this is preferably carried out in air or an inert atmosphere at ordinary temperature and under a compacting pressure of not less than 0.5 ton/cm$^2$, and preferably 20 ton/cm$^2$ or less for better productivity. If the compacting pressure is less than 0.5 ton/cm$^2$, this may be undesirable because the resulting compact may have a bulk density of less than 3.5 g/cm$^3$. When the true density of the alloy is in the range of 7.8 to 7.9 g/cm$^3$, a bulk density of not less than 4.0 g/cm$^3$ can be achieved by using a finely ground powder having an average particle diameter of not greater than 20 $\mu$m and controlling the compacting pressure properly. As used herein, the term "true density" means the volume density of an alloy ingot as measured by the water immersion method.

The porous hydrogen absorbing alloy compact formed in the above-described manner has a specific porosity and contains neither current-collecting support nor binder. Consequently, the mechanical strength of this compact is so low that it may be easily disintegrated by rough handling. Moreover, when this compact is used as an electrode, the alloy powder begins to fall off after several charge-discharge cycles owing to the disintegration of the electrode. Ultimately, the compact returns to the hydrogen absorbing alloy powder before compacting, and hence loses its function as an electrode. According to the present invention, therefore, the porous compact formed from the aforesaid hydrogen absorbing alloy powder alone is impregnated with an aqueous solution of a binder. Thus, there can be obtained an electrode having a structure in which the binder is present in the pores of the compact (having an average pore diameter of 1 to 3 $\mu$m).

FIG. 1 shows the structure of an electrode in accordance with the present invention. In the structure of the electrode of the present invention, the particle diameter of the hydrogen absorbing alloy powder 4 is smaller and its particles are arranged in contact with each other, as contrasted with the structure of the conventional electrode shown in FIG. 2. Consequently, the proportion of the volume occupied by the hydrogen absorbing alloy to the total volume of the electrode is greater. Moreover, the strength of the compact is increased owing the bonding power of a binder 3, and the electrical contact between alloy particles can be established so as to cause the compact to retain its function as an electrode.

Figure 2:
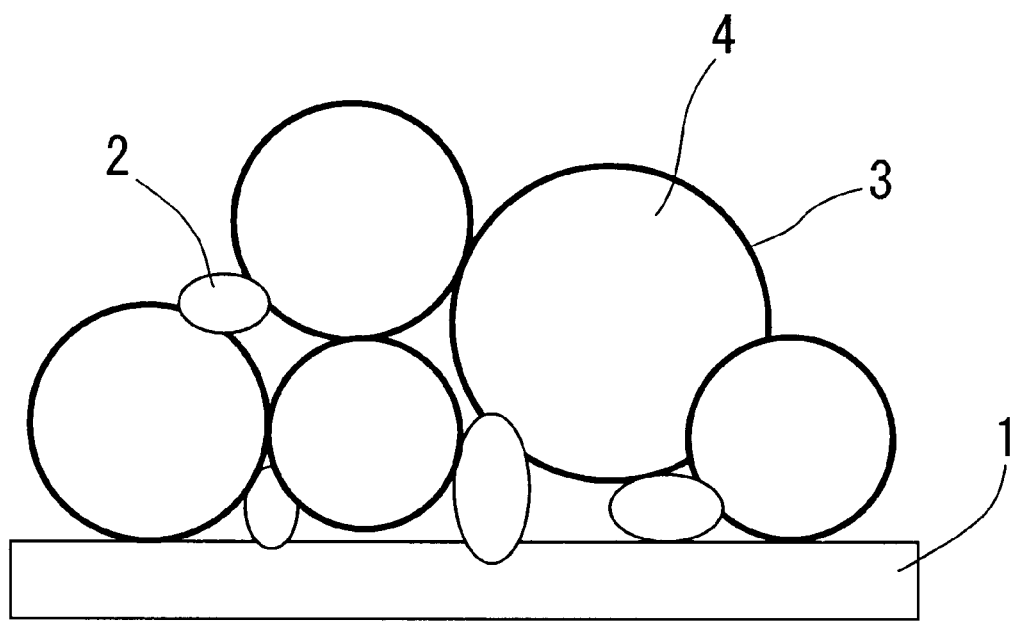
FIG. 2 is a schematic view showing the structure of an electrode comprising a conventional hydrogen absorbing alloy compact for use as the negative electrode of an alkaline rechargeable battery.
Figure 3:
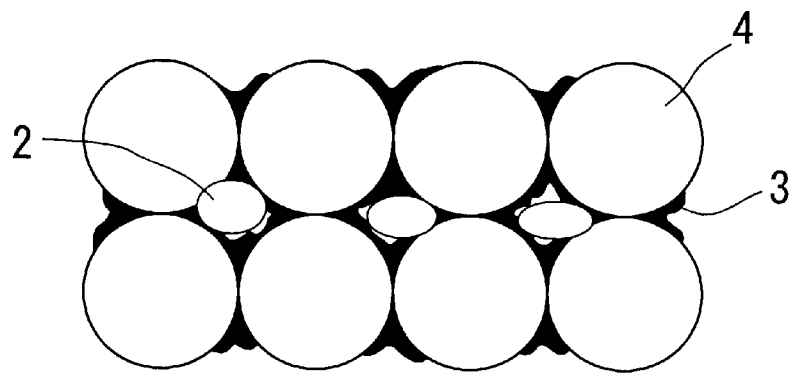
FIG. 3 is a schematic view showing the structure of an electrode comprising another hydrogen absorbing alloy compact for use as the negative electrode of an alkaline rechargeable battery in accordance with the present invention.
Figure 4:
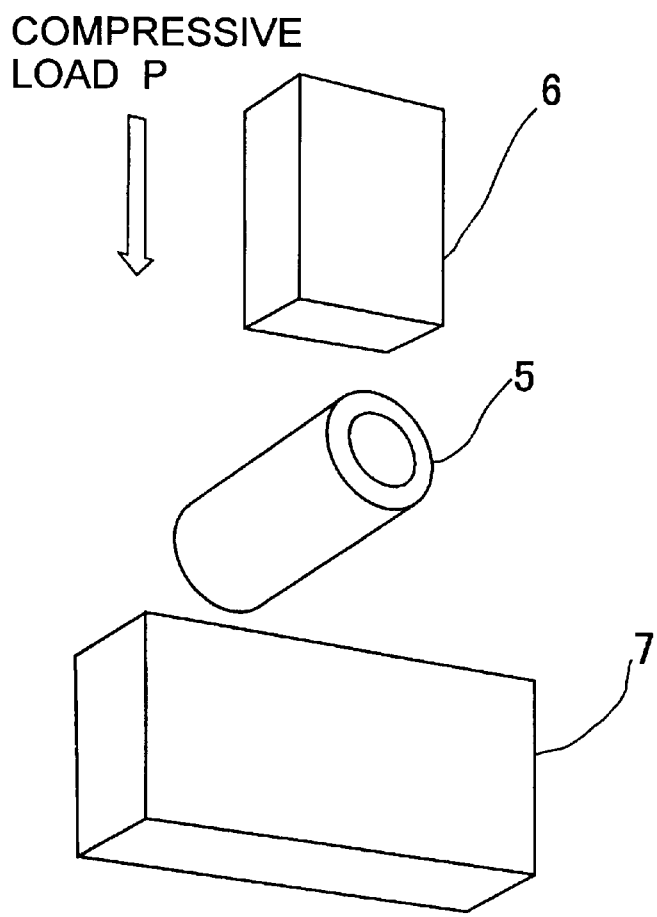
FIG. 4 is a schematic view illustrating a method for measuring the compressive strength of an electrode.

Similarly, FIG. 3 shows the structure of an electrode having an electrically conductive material incorporated therein in accordance with the present invention. It can be seen that, as contrasted with the structure of the conventional electrode shown in FIG. 2 and containing the electrically conductive material 2, the particle diameter of the hydrogen absorbing alloy powder 4 is smaller, particles of the electrically conductive material are uniformly dispersed in the compact, and these particles are arranged in contact with a binder.

In order to impregnate the compact with a binder, the porous compact formed from the aforesaid hydrogen absorbing alloy powder alone or the hydrogen absorbing alloy powder having an electrically conductive material dispersed therein is first soaked in an aqueous solution or solvent solution of the binder. Thus, on the basis of capillary action, the aqueous solution or solvent solution of the binder is fully infiltrated into the pores of the compact. Then, the compact is dried to evaporate only the water or solvent contained therein as a result of the aforesaid impregnation. Thus, in the resulting compact in which the hydrogen absorbing alloy particles are arranged in contact with each other or in which the electrically conductive material is dispersed over the surfaces of the hydrogen absorbing alloy particles, the binder (solute) can be deposited onto the surfaces of the alloy particles facing the interstices within the compact and onto the surface of the compact. This method enables the alloy particles to be strongly guarded by the binder without detracting from the electrical contact between alloy particles, and can hence increase the strength of the compact.

More specifically, the porous compact is soaked in an aqueous solution of the binder (having a concentration of 0.1 to 10% by weight), so that the aqueous binder solution is fully infiltrated into the compact. In this step, it is preferable to infiltrate the aqueous binder solution into the compact after the air present in the internal space thereof is removed by exposure to a vacuum. After the compact was soaked for a predetermined time (in the range of 1 to 48 hours and preferably 5 to 24 hours), it is taken out of the aqueous binder solution and drained well. Then, the compact is dried in vacuo at a temperature of 10 to 80° C. for a period of 5 to 48 hours. Where a thermosetting resin is used as the binder, the compact may be heat-treated in vacuo at the curing temperature of the resin. The amount of binder loaded into the compact (on a solid basis) is preferably in the range of 0.01 to 2% by weight based on the weight of the compact. More preferably, it is in the range of 0.15 to 1% by weight. If the amount of binder loaded is less than 0.01% by weight, the strength of the compact may be reduced and, therefore, the electrode comprising the compact may involve the risk of being disintegrated by repeated charging and discharging. If the amount of binder loaded is greater than 2.0% by weight, the amount of the negative electrode active material may undesirably be decreased to cause a reduction in electric capacity.

No particular limitation is placed on the type of the binder used in the present invention, provided that it is soluble in water or an organic solvent (e.g., alcohol, toluene, hexane or thinner). Examples thereof include polyvinyl alcohol, polyvinyl butyral, polyethylene glycol, polyethylene oxide, methyl cellulose, carboxymethyl cellulose, ethyl cellulose, ethylhydroxyethyl cellulose, lignin, dextrin, hemicellulose, hydroxypropyl cellulose, waxes, thermosetting resins (e.g., acrylic resins, polyurethanes and epoxy resins), thermoplastic resins (e.g., polyethylene), vinyl chloride-vinyl acetate copolymer, synthetic rubbers and electrically conductive polymers. Among others, water-soluble polymers are preferred. More particularly, film-forming binders which are soluble in water but insoluble in aqueous alkaline solutions, such as polyvinyl alcohol and polyethylene oxide, are preferred.

No particular limitation is placed on the concentration of the solution, provided that the concentration gives a viscosity which permits the solution to penetrate into the compact.

However, if it is intended to use the resulting compact as an electrode of an alkaline rechargeable battery, it is more preferable from the viewpoint of electrode performance that the binder film present in the compact have good resistance to alkalis.

When the compact is impregnated with the aqueous binder solution, an electrically conductive material such as nickel, cobalt, copper or carbon may be added to the compact. However, especially when it is desired to enhance the high rate discharge property of the resulting battery, it is preferable to add an electrically conductive material to the alloy during its grinding as described above.

Where an electrically conductive material is added to the binder, various modifications may be applied to the electrode fabrication process. For example, it is possible to impregnate the compact with an aqueous binder solution in which an ultrafine powder (1 µm or less) of an electrically conductive material has been dispersed, or repeat the binder impregnation procedure two or more times.

Furthermore, according to the present invention, the binder may previously be deposited on the surfaces of the hydrogen absorbing alloy powder. For example, it is possible to prepare a slurry from the hydrogen absorbing alloy powder having the binder deposited on the surfaces thereof, dry slurry in vacuo, and reduce the resulting mass to a granulating powder having an average particle diameter of around 100 µm by means of a disintegrator. This granulating powder may be pulverized and used as a raw material for the formation of a compact.

In spite of the absence of a current-collecting support (or electrically conductive core), the compacts made by the above-described methods have a high mechanical strength and can hence be machined by dry grinding. Moreover, they can be directly used as negative electrodes simply by attaching a lead thereto. Since good electrical contact is established, these electrodes can achieve a desired discharge capacity without suffering specimen disintegration due to charge-discharge cycles. Furthermore, they can also be utilized in other fields of application such as heat pumps.

Now, the method of making the rectangular hydrogen absorbing alloy compact is described below.

The above-described hydrogen absorbing alloy powder is charged into a die and pressed to form a compact having a desired shape. No particular limitation is placed on the compacting method employed, and useful compacting methods include, for example, die pressing, rubber pressing, extrusion molding and injection molding. A compact having a slit extending therethrough can similarly be formed with the aid of a die or the like. Moreover, in the present invention the compact so formed may be ground into a rectangular compact. When vertical die pressing is employed, this is preferably carried out in air or an inert atmosphere at ordinary temperature and under a compacting pressure of not less than 0.5 ton/cm², and preferably 20 ton/cm² or less for better productivity. If the compacting pressure is less than 0.5 ton/cm², this may be rather undesirable because the resulting compact may have a bulk density of not greater than 4 g/cm³ (and a porosity of not less than 50%) and hence show an extreme reduction in the strength of the compact. A rectangular compact having the desired bulk density (of not less than 4 g/cm³) can be obtained by controlling the compacting pressure properly (when the true density of the alloy is in the range of 7.8 to 7.9 g/cm³).

The polyhedral hydrogen absorbing alloy compact of the present invention preferably has a porosity of 15 to 55%, preferably 25 to 55%, so that, when it is used as the negative electrode of an alkaline rechargeable battery, the electrolytic solution may easily penetrate into the electrode. As used herein, the term "porosity" means the proportion of the void space of the compact as based on the true density of the alloy [i.e., {1–(bulk density of compact)/(true density of alloy)}× 100]. The true density is the density of a hydrogen absorbing alloy ingot. The bulk density of the compact can be determined on the basis of its weight and its volume measured by coating the compact with a water-repellent film (e.g., of paraffin) and measuring its volume according to the water immersion method. The polyhedral compact may take, for example, a rectangular (cubic or plate-like), hexagonal, or octagonal column shape.

From the viewpoint of electric capacity and porosity, the polyhedral hydrogen absorbing alloy compact of the present invention preferably has a bulk density of 3.5 to 6.5 g/cm³, and preferably 3.5 to 6.0 g/cm³.

The porous polyhedral hydrogen absorbing alloy compact formed in the above-described manner has a specific porosity and contains neither current-collecting support nor binder. Consequently, the mechanical strength of this compact is so low that it may be easily disintegrated by rough handling. Moreover, when this compact is used as an electrode, the alloy powder begins to fall off after several charge-discharge cycles owing to the disintegration of the electrode. Ultimately, the compact returns to the hydrogen absorbing alloy powder before compacting, and hence loses its function as an electrode. As a means for solving this problem, the present inventors have found a method for increasing the strength of the compact and maintaining its function as an electrode. That is, the rectangular compact formed from a hydrogen absorbing alloy powder alone according to the present invention is impregnated with an aqueous solution of a binder, so that the binder is deposited in the open pores of the compact having an average pore diameter of 1 to 3 µm. Thus, the strength of the compact is increased owing the bonding power of the binder, and the electrical contact between alloy particles can be established so as to cause the compact to retain its function as an electrode. The structure of an electrode in accordance with the present invention is shown in FIG. 1, and the structure of a conventional electrode is shown in FIG. 2.

The binder impregnation method employed to make the rectangular compact of the present invention comprises the steps of using the aforesaid hydrogen absorbing alloy powder alone or the hydrogen absorbing alloy powder having an electrically conductive material mixed therewith to form a rectangular compact containing neither current-collecting support nor binder; infiltrating an aqueous solution (or solvent solution) of a binder fully into the open pores of the compact on the basis of capillary action; and evaporating only the water or solvent to deposit the binder (solute) onto the surfaces of the alloy particles facing the pores within the compact. According to this method, the alloy particles are strongly guarded by the binder without detracting from the electrical contact between alloy particles, so that the strength of the compact can be increased.

More specifically, the porous rectangular compact is soaked in an aqueous solution of the binder (having a concentration of 0.1 to 10% by weight), so that the aqueous binder solution is fully infiltrated into the compact. In this step, it is preferable to infiltrate the aqueous binder solution into the compact after the air present in the internal space thereof is removed by exposure to a vacuum. After the compact was soaked for a predetermined time (in the range of 1 to 48 hours and preferably 5 to 24 hours), it is taken out of the aqueous binder solution and drained well. Then, the compact is dried in vacuo (at a temperature of 10 to 80° C. for a period of 5 to 48 hours). Where a thermosetting resin is used as the binder, the compact may be heat-treated in vacuo at the curing temperature of the resin.

No particular limitation is placed on the type of the binder used. With consideration for the mechanical strength and electrical conductivity of the compact, the amount of binder loaded is preferably in the range of 0.01 to 2.0% by weight based on the hydrogen absorbing alloy.

The binders which can be used to make the rectangular compact of the present invention are as described previously.

No particular limitation is placed on the concentration of the solution, provided that the concentration gives a viscosity which permits the solution to penetrate into the compact.

However, if it is intended to use the resulting compact as an electrode of an alkaline rechargeable battery, it is more preferable from the viewpoint of electrode performance that the binder film present in the compact have good resistance to alkalis.

During the formation of the compact, it is possible to add an electrically conductive material (e.g., Ni, Cu or carbon) to the compact in an amount of 1 to 10% by weight and thereby enhance the high-rate discharge characteristics and other characteristics thereof.

Moreover, various modifications may be applied to the electrode fabrication process. For example, it is possible to impregnate the compact with an aqueous binder solution in which an ultrafine powder (1 $\mu$m or less) of an electrically conductive material has been dispersed, or repeat the binder impregnation procedure two or more times.

Figure 5:
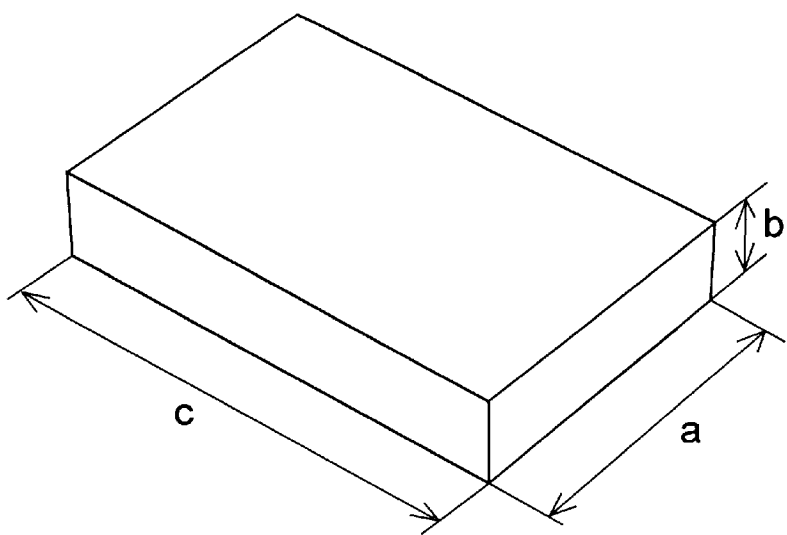
FIG. 5 is a view of a compact having the shape of a rectangular parallelepiped in accordance with the present invention.
Figure 6:
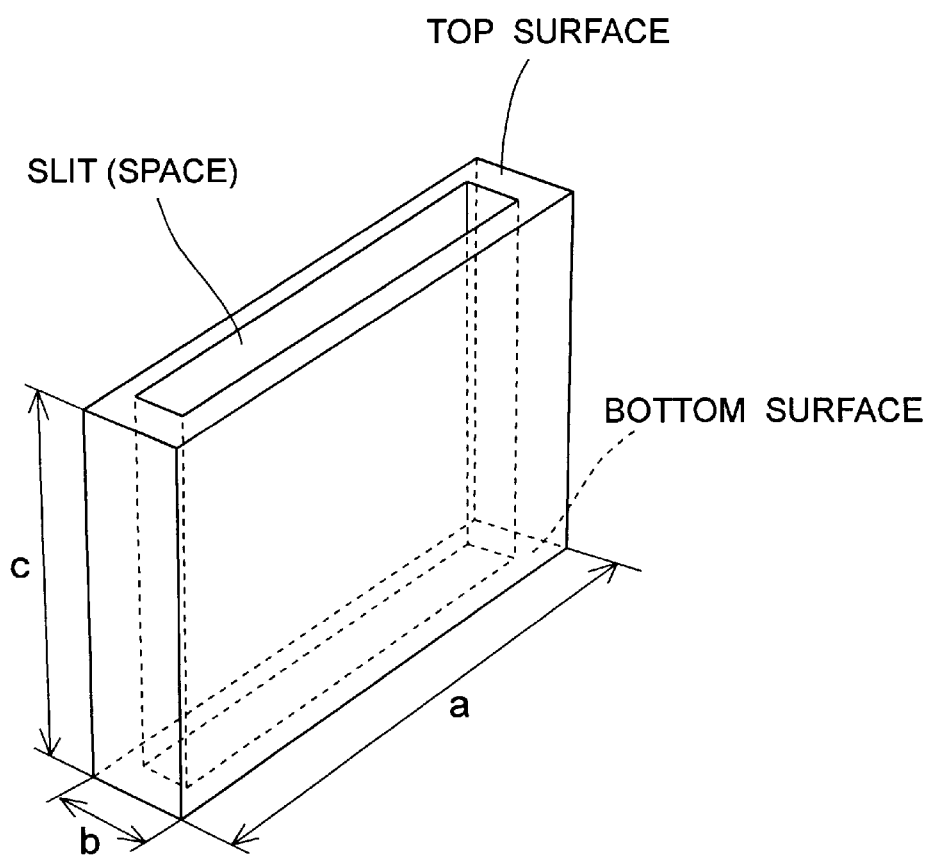
FIG. 6 is a view of a rectangular compact having a slit in accordance with the present invention.

In spite of the absence of a current-collecting support (or electrically conductive core), the rectangular compacts made in the above-described manner have a high mechanical strength and can hence be machined by dry grinding. Moreover, since good electrical contact is established, the rectangular compacts, when used as electrodes, can achieve a desired discharge capacity without suffering specimen disintegration due to charge-discharge cycles. Furthermore, they can also be utilized in other fields of application such as heat pumps. When the dimensions of a rectangular compact are represented by a (long side), b (short side) and c (height), compacts having a slit are made under the conditions satisfying the relationship $b<a\leqq c$ or $b<c\leqq a$, and plate-like compacts are made under the conditions satisfying the relationship $b<a\leqq c$. In these cases, it is preferable that the a/b ratio be not less than 2. In the present invention, any surface containing the short side (b) is regarded as the bottom surface. In the case of plate-like compacts, it is especially preferable that the short side (b) be not greater than 2 mm. FIG. 5 illustrates a compact in the form of a rectangular parallelepiped, and FIG. 6 illustrates a rectangular compact having a slut extending therethrough.

Recently, the size and weight of portable equipment such as cordless telephones and PDAs are being increasingly reduced. However, the reduction in size has nearly reached a limit from a practical point of view, for example, because of the problem that an excessive reduction in size makes operations difficult. In order to achieve a further reduction in size and weight, it is promising to decrease the thickness. Correspondingly, there is a strong demand for thin batteries. According to the present invention, not only the volume occupied by the battery can be reduced, but also the compact for use as an electrode may be made so as to have a rectangular shape. Specifically, the compact may be made in the shape of a rectangular parallelepiped (i.e., a plate) or a rectangular parallelepiped having a cavity for receiving a positive electrode, and used as the negative electrode of a rechargeable battery. In particular, the present invention provides a compact for use as an electrode which is in the shape of a rectangular parallelepiped having a slit extending vertically from the bottom surface to the top surface. By inserting a separator and a positive electrode into the slit, this compact can yield a nickel-hydrogen rechargeable battery having a high capacity and a small thickness. If the rectangular parallelepiped is such that the ratio (a/b) of the long side (a) to the short side (b) of the bottom surface is not less than 2, the shape of the compact is more preferred. The shape of the slit may be either cylindrical or rectangular, provided that it can contain a positive electrode and a separator. Alternatively, a nickel-hydrogen rechargeable battery having a small thickness can also be constructed by making a compact for use as an electrode which has the shape of a rectangular plate (with a thickness (corresponding to the aforesaid short side (b)) of 2 mm or less), disposing this compact on a positive electrode with a separator interposed therebetween, and bonding them together under pressure. Moreover, the packing density may be increased by stacking such rectangular compacts.

Thus, by using a rectangular compact formed without using an electrically conductive material, there can be constructed a battery charged with a greater amount of active material and having a higher volume energy density. Moreover, since the alloy particles are in direct contact without the aid of any intermediary substance, so that the compact has a higher electrical conductivity and exhibits more excellent charge-discharge characteristics.

The rectangular compact electrode of the present invention may be used in an alkaline rechargeable battery by combining it with a Ni positive electrode suited to the compact and sealing this electrode assembly, together with an electrolytic solution, in a closed vessel.

The present invention is further illustrated by the following examples. However, these examples are not to be construed to limit the scope of the invention.

1. Formation of Porous Compact Electrodes

EXAMPLE 1

A hydrogen absorbing alloy ingot (consisting of a rare earth element mixture (composed of 63% by weight of La, 7% by weight of Ce, 22% by weight of Pr, and 8% by weight of Nd), Ni, Co, Mn and Al in atomic ratios of 1.0, 3.75, 0.75, 0.20 and 0.30, respectively) was made by means of a high-frequency melting furnace, and then heat-treated in argon to obtain a homogeneous hydrogen absorbing alloy ingot. This alloy ingot was crushed in an atmosphere of nitrogen. Then, using a Brown mill, the crushed alloy was ground to 1 mm or less, so that there was obtained a raw material for jet milling. Moreover, according to the present invention, this hydrogen absorbing alloy was dry-ground in an atmosphere of nitrogen gas by means of a jet mill having a gas pressure of 5.8 kgf/cm$^2$. Thus, there was obtained a finely ground hydrogen absorbing alloy powder having an average particle diameter of 6 $\mu$m and a particle size distribution breadth of 1 to 30 $\mu$m as measured by laser diffractometry. This hydrogen absorbing alloy powder had an oxygen concentration of 0.37% by weight as measured by inert gas melting infrared absorption spectrophotometry.

Subsequently, about 2.6 g of the above finely ground powder was charged into a metal die and pressed under a pressure of 2.0 tons/cm$^2$ to form a cylinder having an outer diameter of 11 mm, an inner diameter of 7 mm, and a length of 10 mm. This porous hydrogen absorbing alloy compact was placed in a 1 wt % aqueous solution of polyvinyl alcohol, degassed, and immersed for 24 hours. After it was confirmed that the compact was fully impregnated with the aqueous binder solution, it was taken out and dried in vacuo. The compact had a bulk density of 4.4 g/cm$^3$ (obtained on the basis of the volume and mass of the compact) and a porosity of 43%. The amount of binder loaded (on a solid basis) was about 0.1% by weight based on the weight of the compact. This porous compact electrode is referred to as the electrode of Example 1.

EXAMPLE 2

A porous compact electrode was made in exactly the same manner as in Example 1, except that a 5 wt % aqueous solution of polyvinyl alcohol was used as the aqueous binder solution. The amount of binder loaded (on a solid basis) was about 0.5% by weight based on the weight of the compact. This porous compact electrode is referred to as the electrode of Example 2.

EXAMPLE 3

A porous compact electrode was made in exactly the same manner as in Example 1, except that a 1 wt % aqueous solution of polyethylene oxide was used as the aqueous binder solution. The amount of binder loaded (on a solid basis) was about 0.1% by weight based on the weight of the compact. This porous compact electrode is referred to as the electrode of Example 3.

Comparative Example 1

In Example 1, the porous hydrogen absorbing alloy compact before impregnation with the binder was used as the electrode of Comparative Example 1.

EXAMPLE 4

Using a Brown mill, the same alloy ingot as used in Example 1 was ground to 1 mm or less. After an electrically conductive material comprising carbonylnickel (#255, manufactured by INCO; average particle diameter about 15 $\mu$m) was added to the hydrogen absorbing alloy in an amount of 2% by weight, this resulting mixture was preblended for 30 minutes by means of a conical blender having an atmosphere of air, so that there was obtained a raw material for jet milling. Moreover, according to the present invention, this hydrogen absorbing alloy was dry-ground in an atmosphere of nitrogen by means of a jet mill having a gas pressure of 5.8 kgf/cm$^2$. Thus, there was obtained a finely ground hydrogen absorbing alloy powder having an average particle diameter of 6 $\mu$m and a particle size distribution breadth of 1 to 30 $\mu$m as measured by laser diffractometry. This hydrogen absorbing alloy powder had an oxygen concentration of 0.37% by weight as measured by inert gas melting infrared absorption spectrophotometry. Thereafter, a porous compact electrode was made in the same manner as in Example 1. This porous compact electrode is referred to as the electrode of Example 4.

EXAMPLE 5

A porous compact electrode was made in exactly the same manner as in Example 4, except that a 5 wt % aqueous solution of polyvinyl alcohol was used as the aqueous binder solution. The amount of binder loaded (on a solid basis) was about 0.5% by weight based on the weight of the compact. This porous compact electrode is referred to as the electrode of Example 5.

EXAMPLE 6

A porous compact electrode was made in exactly the same manner as in Example 4, except that the electrically conductive material was added to the hydrogen absorbing alloy in an amount of 10% by weight. This porous compact electrode is referred to as the electrode of Example 6.

Comparative Example 2

In Example 4, the porous hydrogen absorbing alloy compact before impregnation with the binder was used as the electrode of Comparative Example 2.

2. Measurement of Alloy Capacities

Charge-discharge tests on porous hydrogen absorbing alloy compact electrodes were carried out for the purpose of evaluating their electrode capacities and cycle characteristics and, moreover, examining them for the occurrence of specimen disintegration after the charge-discharge tests. The procedure for these tests and the results thereof are given below.

Each of the porous hydrogen absorbing alloy compact electrodes made in Examples 1–6 and Comparative Examples 1–2 was wrapped with a 100 mesh nickel net having a wire diameter of 0.07 mm to form an electrode. The discharge capacity of this electrode was measured in an open battery of the negative electrode regulation type. Six normal aqueous potassium hydroxide was used as the electrolytic solution. The testing conditions were as follows: At a constant temperature of 20° C., the battery was charged at 60 mA/g (based on the hydrogen absorbing alloy alone, exclusive of the electrically conductive material) for 3 hours (to a depth of charging of 60%), rested for 30 minutes, and discharged at 60 mA/g until the battery voltage reached 0.8 V. After repeating this charge-discharge cycle nine times, the discharge rate was increased to 300 mA/g and the 10th charge-discharge cycle was carried out. Thereafter, the electrode was disassembled and examined for the disintegration of the compact with a microscope. The results thus obtained are shown in Table 1.

TABLE 1

|  | Discharge capacity in cycle 1 (mAh/g) | Discharge capacity in cycle 9 (mAh/g) | Discharge capacity in cycle 10 (mAh/g) | Appearance of specimen after charge-discharge cycles |
|---|---|---|---|---|
| Example 1 | 180 | 180 | — | Not disintegrated |
| Example 2 | 180 | 180 | — | Not disintegrated |
| Example 3 | 180 | 180 | — | Not disintegrated |
| Comparative Example 1 | 180 | 0 | — | Disintegrated |
| Example 4 | 180 | 180 | 62 | Not disintegrated |
| Example 5 | 180 | 180 | 59 | Not disintegrated |
| Example 6 | 180 | 180 | 117 | Not disintegrated |
| Comparative Example 2 | 179 | 0 | 0 | Disintegrated |

With respect to the electrodes of Examples 1, 2 and 3 which were impregnated with polyvinyl alcohol or polyethylene oxide, it was confirmed that a predetermined discharge capacity was achieved in the 9-cycle charge-discharge tests and they suffered no specimen disintegration. Thus, it was found that they could function as electrodes in spite of the absence of a current-collecting support within the compacts. On the other hand, in the compact electrode of Comparative Example 1 which contained no binder, specimen disintegration occurred after several charge-discharge cycles, so that the hydrogen absorbing alloy powder constituting the compact fell off scatteringly. Thus, it was confirmed that this compact electrode lost its function as an electrode owing to specimen disintegration. Moreover, substantially the same results as described above were recognized when the depth of charging was altered to 100%.

With respect to the electrodes of Examples 4, 5 and 6 which were made by pressing a hydrogen absorbing alloy powder containing an electrically conductive material mixed therewith during grinding and impregnating the resulting compact with polyvinyl alcohol, a predetermined discharge capacity was achieved in the 9-cycle charge-discharge tests.

Moreover, they exhibited a discharge capacity of not less than 50 mAh/g in the 10th cycle using a discharge rate of 300 mAh/g, without suffering specimen disintegration.

In the compact electrode of Comparative Example 2 which contained no binder, specimen disintegration occurred after several charge-discharge cycles, so that the hydrogen absorbing alloy powder constituting the compact fell off scatteringly. Thus, it was confirmed that this compact electrode lost its function as an electrode owing to specimen disintegration. Thus, it was confirmed that the electrically conductive material-containing compact electrodes of the present invention could function as electrodes in spite of the absence of a current-collecting support within the compacts. The reason for this is believed that, when an electrically conductive material is mixed with the hydrogen absorbing alloy during its grinding, the electrically conductive material adheres to the surfaces of hydrogen absorbing alloy particles owing to the surface energy of the surfaces newly formed by grinding, so that the electrically conductive material is uniformly dispersed in the compact without cohering together. This makes it possible to improve the electrical conductivity of the resulting compact electrode and hence achieve a high discharge capacity even at an increased discharge rate. Moreover, substantially the same results as described above were recognized when the depth of charging was altered to 100%.

3. Measurement of Mechanical Strengths

The compressive strengths of porous hydrogen absorbing alloy compact electrodes were measured for the purpose of examining the mechanical strengths of specimens impregnated with a binder. The procedure for these tests and the results thereof are given below.

With respect to each of the compact electrodes made in Examples 1–6 and Comparative Examples 1–2, a cylindrical specimen 5 was mounted between a movable head 6 and a specimen support 7. Then, the fracture strength P per unit length of the specimen 5 was measured by applying a compressive load P thereto from above. The results thus obtained are shown in Table 2.

TABLE 2

| Specimen | Bulk density of specimen (g/cm$^3$) | Amount of binder loaded (wt %) | Content of electrically conductive material (wt %) | Evaluation Compressive fracture strength P (N/cm) |
|---|---|---|---|---|
| Example 1 | 4.4 | 0.14 | 0 | 25 |
| Example 2 | 4.4 | 0.55 | 0 | 60 |
| Example 3 | 4.4 | 0.08 | 0 | 11 |
| Comparative Example 1 | 4.4 | 0 | 0 | 7 |
| Example 4 | 4.4 | 0.13 | 2 | 26 |
| Example 5 | 4.4 | 0.52 | 2 | 63 |
| Example 6 | 4.5 | 0.13 | 10 | 27 |
| Comparative Example 2 | 4.4 | 0 | 2 | 7 |

It was confirmed that the specimens of Examples 1–6 which were impregnated with a binder had a compressive fracture strength of greater than 10 N/cm and could hence be subjected to dry machining (e.g., grinding of the outer periphery and grinding in the direction of the height). In particular, the specimens of Examples 2 and 5 which contained a greater amount of binder loaded exhibited a compressive fracture strength of about 60 N/cm and hence had such a mechanical strength as to withstand dry machining easily. On the other hand, the specimens of Comparative Examples 1–2 which contained no binder exhibited a compressive fracture strength of less than 10 N/cm and hence had such a mechanical strength as not to withstand dry machining.

EXAMPLE 7

A hydrogen absorbing alloy ingot (consisting of a rare earth element mixture (composed of 63% by weight of La, 7% by weight of Ce, 22% by weight of Pr, and 8% by weight of Nd), Ni, Co, Mn and Al in atomic ratios of 1.0, 3.75, 0.75, 0.20 and 0.30, respectively) was made by means of a high-frequency melting furnace, and then heat-treated in argon to obtain a homogeneous hydrogen absorbing alloy ingot. This alloy ingot was crushed in an atmosphere of nitrogen. Then, using a Brown mill, the crushed alloy was ground to 1 mm or less, so that there was obtained a raw material for jet milling. Moreover, according to the present invention, this hydrogen absorbing alloy was dry-ground in an atmosphere of nitrogen gas by means of a jet mill having a gas pressure of 5.8 kgf/cm$^2$. Thus, there was obtained a finely ground hydrogen absorbing alloy powder having an average particle diameter of 6 μm and a particle size distribution breadth of 1 to 30 μm. When the oxygen concentration of this hydrogen absorbing alloy powder, it was found to be 0.37% by weight. Subsequently, about 2.2 g of the above finely ground powder was-charged into a metal die and pressed under a pressure of 2.0 tons/cm$^2$ to form a rectangular compact measuring 15 mm (length)×5 mm (breadth)×10 mm (height) and having a 13 mm (length)×2 mm (breadth) slit extending vertically from the bottom surface to the top surface. This porous hydrogen absorbing alloy compact was placed in a 1 wt % aqueous solution of polyvinyl alcohol, degassed for a predetermined time, and immersed for 24 hours. After it was confirmed that the compact was fully impregnated with the aqueous binder solution, it was taken out and dried in vacuo. The compact had a bulk density of 4.48 g/cm$^3$ and a porosity of 32%. The amount of binder loaded (on a solid basis) was about 0.1% by weight based on the weight of the compact. This porous compact electrode is referred to as electrode A.

EXAMPLE 8

A porous compact electrode was made in exactly the same manner as in Example 7, except that a 5 wt % aqueous solution of polyvinyl alcohol was used as the aqueous binder solution. The amount of binder loaded (on a solid basis) was about 0.5% by weight based on the weight of the compact. This porous compact electrode is referred to as electrode B.

EXAMPLE 9

A compact electrode was made in the same manner as in Example 7, except that the compact was in the shape of a flat plate measuring 30 mm (length)×15 mm (breadth)×1 mm (height). The weight of the finely ground powder used for this purpose was 1.98 g, the compact had a bulk density of 4.4 g/cm$^3$ and a porosity of 31%, and the amount of binder loaded (on a solid basis) was about 0.15% by weight based on the weight of the compact. This porous compact electrode is referred to as electrode C.

Comparative Example 3

In Example 7, the porous hydrogen absorbing alloy compact before impregnation with the binder was used as electrode D.

(Measurement of Alloy Capacities)

Charge-discharge tests on porous hydrogen absorbing alloy compact electrodes were carried out for the purpose of evaluating their electrode capacities and cycle characteristics and, moreover, examining them for the occurrence of specimen disintegration after the charge-discharge tests. The procedure for these tests and the results thereof are given below. Each of the porous hydrogen absorbing alloy compact electrodes A to D made in Examples 7–9 and Comparative Example 3 was wrapped with a 100 mesh nickel net having a wire diameter of 0.07 mm to form an electrode. The discharge capacity of this electrode was measured in an open battery of the negative electrode regulation type. Six normal aqueous potassium hydroxide was used as the electrolytic solution. The testing conditions were as follows: At a constant temperature of 20° C., the battery was charged at 60 mA/g for 3 hours (to a depth of charging of 60%), rested for 30 minutes, and discharged at 60 mA/g until the battery voltage reached 0.8 V. After repeating this charge-discharge cycle ten times, the electrode was disassembled and examined for the disintegration of the compact with a microscope. The results thus obtained are shown in Table 3.

TABLE 3

|  | Electrode | Discharge capacity in cycle 1 (mAh/g) | Discharge capacity in cycle 2 (mAh/g) | Discharge capacity in cycle 10 (mAh/g) | Appearance of specimen after charge-discharge cycles |
|---|---|---|---|---|---|
| Example 7 | A | 181 | 182 | 181 | Not disintegrated |
| Example 8 | B | 180 | 179 | 180 | Not disintegrated |
| Example 9 | C | 182 | 181 | 181 | Not disintegrated |
| Comparative Example 3 | D | 180 | 102 | 0 | Disintegrated |

With respect to the electrodes of Examples 7, 8 and 9 which were impregnated with polyvinyl alcohol, it was confirmed that a predetermined discharge capacity was achieved in the 10-cycle charge-discharge tests and they suffered no specimen disintegration. Thus, it was found that they could function as electrodes in spite of the absence of a current-collecting support within the compacts.

In the compact electrode of Comparative Example 3 which contained no binder, specimen disintegration occurred after several charge-discharge cycles, so that the hydrogen absorbing alloy powder constituting the compact fell off scatteringly. Thus, it was confirmed that this compact electrode lost its function as an electrode owing to specimen disintegration. Moreover, substantially the same results were recognized when the depth of charging was altered to 100%.

What is claimed is:

1. A hydrogen absorbing alloy compact for use as the negative electrode of an alkaline rechargeable battery which is made without the aid of a current-collecting support, comprises a binder dispersed in the interstices formed by mutual contact of hydrogen absorbing alloy particles and on the alloy surfaces, and has a bulk density of 3.5 to 6.5 g/cm$^3$, the hydrogen absorbing alloy powder having an oxygen concentration of not greater than 0.50 percent by weight.

2. A hydrogen absorbing alloy compact for use as the negative electrode of an alkaline rechargeable battery as claimed in claim 1 wherein said hydrogen absorbing alloy compact has a porosity of 15 to 55%.

3. A hydrogen absorbing alloy compact for use as the negative electrode of an alkaline rechargeable battery as claimed in claim 1 wherein said hydrogen absorbing alloy compact has a porosity of 25 to 55%.

4. A hydrogen absorbing alloy compact for use as the negative electrode of an alkaline rechargeable battery as claimed in claim 1 wherein said binder is a water-soluble polymer.

5. A hydrogen absorbing alloy compact for use as the negative electrode of an alkaline rechargeable battery as claimed in claim 1 wherein the compact is a circular or polyhedral cylinder.

6. A hydrogen absorbing alloy for use as the negative electrode of an alkaline rechargeable battery as claimed in claim 1, wherein the compact has a rectangular or plate-like shape.

7. A hydrogen absorbing alloy for use as the negative electrode of an alkaline rechargeable battery as claimed in claim 1, wherein the bottom of rectangular compact has a length a for a longer side and a length b for a shorter side, where the ratio of a to b is 2 or larger.

8. A hydrogen absorbing alloy for use as the negative electrode of an alkaline rechargeable battery as claimed in claim 5, wherein a through hole is provided to penetrate substantially vertically from the bottom face to the top face of the compact.

9. A hydrogen absorbing alloy for use as the negative electrode of an alkaline rechargeable battery as claimed in claim 8, wherein the cross-sectional shape of the hole is circular or polygonal.

10. A hydrogen absorbing alloy for use as the negative electrode of an alkaline rechargeable battery as claimed in claim 5, wherein a hole is provided so as not to penetrate the compact and wherein the length of the hole is 50% or less of the vertical length of the compact.

11. A hydrogen absorbing alloy for use as the negative electrode of an alkaline rechargeable battery as claimed in claim 1, wherein said hydrogen absorbing alloy powder is obtained by grinding in an inert gas and contains an electrically conductive material mixed therewith during the grinding.

12. An alkaline rechargeable battery electrode comprising the compact as claimed in claim 1.

13. An alkaline rechargeable battery comprising the electrode as claimed in claim 12.

14. A hydrogen absorbing alloy compact for use as the negative electrode of an alkaline rechargeable battery which is made without the aid of a current-collecting support, comprises a binder dispersed in the interstices formed by mutual contact of hydrogen absorbing alloy particles and on the alloy surfaces, and has a bulk density of 3.5 to 6.5 g/cm$^3$, the hydrogen absorbing alloy powder having an average particle diameter of not greater than 20 $\mu$m.

15. A hydrogen absorbing alloy compact for use as the negative electrode of an alkaline rechargeable battery as claimed in claim 14 wherein said hydrogen absorbing alloy compact has a porosity of 15 to 55%.

16. A hydrogen absorbing alloy compact for use as the negative electrode of an alkaline rechargeable battery as claimed in claim 14 wherein said hydrogen absorbing alloy compact has a porosity of 25 to 55%.

17. A hydrogen absorbing alloy compact for use as the negative electrode of an alkaline rechargeable battery as claimed in claim 14 wherein said binder is a water-soluble polymer.

18. A hydrogen absorbing alloy compact for use as the negative electrode of an alkaline rechargeable battery as claimed in claim 14 wherein the compact is a circular or polyhedral cylinder.

19. A hydrogen absorbing alloy for use as the negative electrode of an alkaline rechargeable battery as claimed in claim 14, wherein the compact has a rectangular or plate-like shape.

20. A hydrogen absorbing alloy for use as the negative electrode of an alkaline rechargeable battery as claimed in claim 14, wherein the bottom of rectangular compact has a length a for a longer side and a length b for a shorter side, where the ratio of a to b is 2 or larger.

21. A hydrogen absorbing alloy for use as the negative electrode of an alkaline rechargeable battery as claimed in claim 18, wherein a through hole is provided to penetrate substantially vertically from the bottom face to the top face of the compact.

22. A hydrogen absorbing alloy for use as the negative electrode of an alkaline rechargeable battery as claimed in claim 21, wherein the cross-sectional shape of the hole is circular or polygonal.

23. A hydrogen absorbing alloy for use as the negative electrode of an alkaline rechargeable battery as claimed in claim 11, wherein a hole is provided so as not to penetrate the compact and wherein the length of the hole is 50% or less of the vertical length of the compact.

24. A hydrogen absorbing alloy for use as the negative electrode of an alkaline rechargeable battery as claimed in claim 18, wherein said hydrogen absorbing alloy powder is obtained by grinding in an inert gas and contains an electrically conductive material mixed therewith during the grinding.

25. An alkaline rechargeable battery electrode comprising the compact as claimed in claim 14.

26. An alkaline rechargeable battery comprising the electrode as claimed in claim 25.

27. A hydrogen absorbing alloy compact for use as the negative electrode of an alkaline rechargeable battery which is made without the aid of a current-collecting support, comprises a binder dispersed in the interstices formed by mutual contact of hydrogen absorbing alloy particles and on the alloy surfaces, and has a bulk density of 3.5 to 6.5 g/cm$^3$, wherein said binder is contained in an amount of 0.01 to 2.0% by weight in said compact.

28. A hydrogen absorbing alloy compact for use as the negative electrode of an alkaline rechargeable battery as claimed in claim 27 wherein said hydrogen absorbing alloy compact has a porosity of 15 to 55%.

29. A hydrogen absorbing alloy compact for use as the negative electrode of an alkaline rechargeable battery as claimed in claim 27 wherein said hydrogen absorbing alloy compact has a porosity of 25 to 55%.

30. A hydrogen absorbing alloy compact for use as the negative electrode of an alkaline rechargeable battery as claimed in claim 27 wherein said binder is a water-soluble polymer.

31. A hydrogen absorbing alloy compact for use as the negative electrode of an alkaline rechargeable battery as claimed in claim 27 wherein the compact is a circular or polyhedral cylinder.

32. A hydrogen absorbing alloy for use as the negative electrode of an alkaline rechargeable battery as claimed in claim 27, wherein the compact has a rectangular or plate-like shape.

33. A hydrogen absorbing alloy for use as the negative electrode of an alkaline rechargeable battery as claimed in claim 27, wherein the bottom of rectangular compact has a length a for a longer side and a length b for a shorter side, where the ratio of a to b is 2 or larger.

34. A hydrogen absorbing alloy for use as the negative electrode of an alkaline rechargeable battery as claimed in claim 31, wherein a through hole is provided to penetrate substantially vertically from the bottom face to the top face of the compact.

35. A hydrogen absorbing alloy for use as the negative electrode of an alkaline rechargeable battery as claimed in claim 34, wherein the cross-sectional shape of the hole is circular or polygonal.

36. A hydrogen absorbing alloy for use as the negative electrode of an alkaline rechargeable battery as claimed in claim 31, wherein a hole is provided so as not to penetrate the compact and wherein the length of the hole is 34% or less of the vertical length of the compact.

37. A hydrogen absorbing alloy for use as the negative electrode of an alkaline rechargeable battery as claimed in claim 1, wherein said hydrogen absorbing alloy powder is obtained by grinding in an inert gas and contains an electrically conductive material mixed therewith during the grinding.

38. An alkaline rechargeable battery electrode comprising the compact as claimed in claim 27.

39. An alkaline rechargeable battery comprising the electrode as claimed in claim 38.

* * * * *

UNITED STATES PATENT AND TRADEMARK OFFICE
CERTIFICATE OF CORRECTION

PATENT NO. : 6,387,148 B1
DATED : May 14, 2002
INVENTOR(S) : Nakano et al.

It is certified that error appears in the above-identified patent and that said Letters Patent is hereby corrected as shown below:

Title page,
Item [54], title, should read as follows: -- HYDROGEN ABSORBING ALLOYCOMPACT FOR USE AS THE NEGATIVE ELECTRODE OF AN ALKALINE RECHARGEABLE BATTERY --
Item [56], OTHER PUBLICATIONS, the following reference should be included:
-- U.S. Patent Application No. 09/282,460; filed: March 31, 1999; priority date: April 3, 1998. --

Column 20,
Line 34, should read as follows: -- the compact and wherein the length of the hole is 50% or less --

Signed and Sealed this

Twenty-ninth Day of July, 2003

JAMES E. ROGAN
*Director of the United States Patent and Trademark Office*